(12) United States Patent
Hamaoka et al.

(10) Patent No.: US 7,792,004 B2  
(45) Date of Patent: Sep. 7, 2010

(54) OPTICAL PICKUP DEVICE

(75) Inventors: Mika Hamaoka, Osaka (JP); Tetsuya Shihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 311 days.

(21) Appl. No.: 12/153,503

(22) Filed: May 20, 2008

(65) Prior Publication Data

US 2008/0291808 A1  Nov. 27, 2008

(30) Foreign Application Priority Data

May 25, 2007  (JP) .............................. 2007-138638

(51) Int. Cl.  
*G11B 7/00* (2006.01)

(52) U.S. Cl. ............. 369/112.02; 369/112.23; 369/112.24; 369/44.23; 369/44.32

(58) Field of Classification Search ............ None  
See application file for complete search history.

(56) References Cited

U.S. PATENT DOCUMENTS

2002/0105890 A1  8/2002  Ogasawara

2004/0257962 A1  12/2004  Walker et al.
2005/0219988 A1  10/2005  Atarashi et al.
2007/0121471 A1*  5/2007  Isshiki et al. ........... 369/112.02
2007/0127348 A1*  6/2007  Ooi et al. ............... 369/112.02

FOREIGN PATENT DOCUMENTS

| JP | 2005-071424 | 3/2005 |
| JP | 2006-147057 | 6/2006 |
| JP | 2006-309903 | 11/2006 |
| WO | WO 2006/121038 A1 | 11/2006 |

* cited by examiner

*Primary Examiner*—Muhammad N. Edun  
(74) *Attorney, Agent, or Firm*—Morgan Lewis & Bockius LLP

(57) ABSTRACT

An optical pickup device includes: a light source; an objective lens which condenses a light beam that is emitted from the light source on a recording layer of an optical recording medium; and a photo detector which receives reflected light that is reflected by the optical recording medium. Further on an optical path between the light source and the objective lens, a liquid lens which performs correction of spherical aberration by changing state of convergence or divergence of the input light beam and a liquid crystal element on which a plurality of phase shift regions are formed to adjust phase of the input light beam, and which performs correction of the spherical aberration by phase adjustment of the phase shift regions are arranged.

12 Claims, 3 Drawing Sheets

OPTICAL PICKUP DEVICE

This application is based on Japanese Patent Application No. 2007-138638 filed on May 25, 2007, and the contents of which are hereby incorporated by reference.

BACKGROUND OF THE INVENTION

1. Field of the Invention

The present invention relates to an optical pickup device in which a light beam is irradiated onto an optical recording medium to enable reading and writing of information, in particular, the present invention relates to structure of an optical pickup device which has a function to correct spherical aberration.

2. Description of Related Art

Optical recording media such as a compact disc (hereinafter referred to as a CD) and a digital versatile disc (hereinafter referred to as a DVD) have become commonplace and widely available. Further, researches to increase quantity of information recorded on the optical recording medium, have been carried on recently. As a result, optical recording media which can record large capacity of information such as a HD-DVD which is high definition DVD and a Blu-ray Disc (hereinafter referred to as a BD) are begun to put into practical use, for example.

Reading of information from the such optical recording medium and writing of information to such optical recording medium are performed utilizing an optical pickup device. Recently, developing of an optical pickup device by which reading and writing of information from/to a plurality of kinds of optical recording medium can be achieved, is performed actively because a plurality of kinds of the optical recording medium are used as above described.

By the way, these optical recording media such as a CD, a DVD, a BD and the like have transparent cover layers of different thickness to protect recording layers. For example, a thickness of the transparent cover layer in a CD is 1.2 mm, the thickness in a DVD is 0.6 mm, and the thickness in a BD is 0.1 mm. In the optical pickup device which has compatibility for the optical recording media that have different thickness of the transparent cover layers as above described, a problem is caused by generation of spherical aberration.

Further, in the optical recording media which especially have a target of high density recording such as a BD or the like, developing of an optical recording medium which has a plurality of recording layers in thickness direction of the optical recording medium is performed actively. When reading of information or the like is performed for the optical recording medium that has a plurality of recording layers utilizing an optical pickup device, a problem is also caused by generation of spherical aberration because thickness of the transparent cover layers are different depending on location of the recording layers (in this case an intermediate layer which is arranged between the recording layers is also counted as the transparent cover layer).

It should be noted that the problem of spherical aberration as above described becomes severe especially in an optical pickup device which utilizes a blue light source that requires an objective lens with large numerical aperture (NA). A demand for an optical pickup device in which the spherical aberration can be adequately corrected, becomes strong recently.

Because of these situations, developing of an optical pickup device which has a function to correct the spherical aberration has been heretofore performed actively. For example, there is an optical pickup device which is capable of correcting the spherical aberration by disposing a beam expander which makes diameter of an optical beam change in an optical system provided in the optical pickup device (for example, see background of the invention of JP-A-2006-147057). Further JP-A-2006-147057 proposes an optical pickup device in which correction of the spherical aberration is performed by disposing a liquid lens which can adjust a focal distance by adjusting applied voltage in an optical system provided in the optical pickup device and changing degree of divergence or degree of convergence of a light beam which is input to an objective lens.

Further JP-A-2005-071424 proposes an optical pickup device in which correction of the spherical aberration is performed by disposing a liquid crystal element in an optical system provided in the optical pickup device and applying voltage to the liquid crystal element such that a light beam that passes the liquid crystal element has arbitrary prescribed phase distribution.

However in case of the optical pickup device in which correction of the spherical aberration is performed utilizing the beam expander, because it has a structure to move a movable lens mechanically, it causes a problem that the optical pickup device tends to become large.

In this regard, in a case of the structure utilizing the liquid crystal element or the liquid lens, because the correction of the spherical aberration is performed by adjustment of the applied voltage, it has merit that the increase of device size can be suppressed in comparison with a case where correction of the spherical aberration is performed utilizing the beam expander. However, in the structure utilizing the liquid lens, it is difficult to perform fine tuned correction such that entire spherical aberration which is generated is made evenly low level in comparison with a case utilizing the liquid crystal element (for example, the liquid crystal element such as utilized in JP-A-2005-71424) in which the spherical aberration can be corrected by a plurality of arranged regions (phase shift regions) where phase of the input light beam can be adjusted. As a result, there is a tendency that a fine tuned correction of the spherical aberration is harder to be performed by the liquid lens than by the above described liquid crystal element.

Among the optical recording media that are proposed nowadays, amount of generation of the spherical aberration is large especially in a BD. Further, in the multilayer optical disc which has a plurality of recording layers, there is a possibility that the number of the recording layers becomes larger in future. That is, double layers disc is put in practical use now, but there is a possibility that four layers disc, six layers disc, and so on are put in practical use. In view of these situation, it is conceivable that optical pickup device which can correct much larger spherical aberration will become necessary in future.

Because of these, it is also conceivable that an optical pickup device that can correct large spherical aberration is structured by disposing a plurality of the liquid crystal elements which can perform correction of the spherical aberration that is provided with a plurality of the phase shift regions. However, it is not preferable because there is a possibility that wiring becomes complicated in such case. Especially in a case where an objective lens and a plurality of liquid crystal element are mounted in integrated manner on an actuator that is arranged to perform movement of the objective lens in order to suppress generation of coma aberration, problem of complicated wiring becomes severe.

SUMMARY OF THE INVENTION

In view of the above described problems, it is a first object of the present invention to provide an optical pickup device which can correct large spherical aberration adequately. Further, it is another object of the present invention to provide an optical pickup device which can suppress that wiring becomes complicated with achieving the first object.

To attain the above described object an optical pickup device in accordance with the present invention includes: a light source; an objective lens which condenses a light beam that is emitted from the light source on a recording layer of an optical recording medium; a photo detecting portion which receives reflected light that is reflected by the optical recording medium; a liquid crystal element which is disposed on an optical path between the light source and the objective lens, on which a plurality of phase shift regions are formed to adjust phase of the input light beam, and which performs correction of spherical aberration by phase adjustment of the phase shift regions; and a liquid lens which is disposed on the optical path between the light source and the objective lens, and which performs correction of the spherical aberration by changing state of convergence or divergence of the input light beam.

By this structure it becomes possible to correct large spherical aberration because the correction of the spherical aberration is performed by two elements of the liquid crystal element and the liquid lens. Further, because one of the two elements to perform correction of the spherical aberration is the liquid crystal element which performs correction of the spherical aberration by adjusting phase of the plurality of phase shift regions formed, it becomes possible to perform fine tuned correction such that entire spherical aberration which is generated is made evenly low level. As a result correction of large spherical aberration can be performed more adequately.

Further, it is preferable that the liquid lens is driven utilizing a driving portion which drives the liquid crystal element in the optical pickup device according to the present invention and structured as above described. By this arrangement, wirings of the optical pickup device does not become complicated even when two elements which can perform correction of the spherical aberration are disposed in order to correct large spherical aberration because the driver for the elements is only one. As a result, production cost increase for the optical pickup device and quantity of work for production can be suppressed, and further, down sizing and weight saving of the optical pickup device can be realized.

In addition, the driving portion may be arranged to output pulse voltage, the liquid crystal element may be driven by the pulse voltage, a low pass filter to smooth waveform of the voltage that is output from the driving portion may be disposed between the driving portion and the liquid lens, and the liquid lens may be driven by output voltage from the low pass filter in the optical pickup device according to the present invention and structured as above described. Generally speaking, two drivers are necessary to drive the liquid crystal element which is driven by applying pulse voltage when it is driven, and the liquid lens which is driven by applying constant voltage continuously. However, according to the present invention, a structure in which the liquid crystal element and the liquid lens can be driven by the same one driver (driving portion), can be easily realized.

Further, it is preferable that an actuator on which the objective lens is mounted and which enables the objective lens to move is provided, and the liquid crystal element and the liquid lens are mounted on the actuator with the objective lens in the optical pickup device according to the present invention and structured as above described. By this arrangement, even if the objective lens is shifted for tracking control, generation of coma aberration which is caused by positional displacement between the objective lens and the liquid lens and the liquid crystal element, can be suppressed because the liquid crystal element and the liquid lens are moved along with the objective lens.

In addition it is preferable that the liquid crystal element is disposed nearer to the objective lens between the liquid crystal element and the liquid lens in the optical pickup device according to the present invention and structured as above described. The liquid crystal element is disposed in the optical pickup device in consideration that fine tuned correction can be performed such that generated spherical aberration is evenly suppressed in a low level as a whole. In this regard, if the liquid lens is disposed in nearer side to the objective lens than the liquid crystal element, there is a possibility that effect of the fine tuned correction may be reduced because the laser beam is converged or diverged by passing the liquid lens after the fine tuned correction is performed by the liquid crystal element. In this regard, when they are structured according to the present invention, it becomes possible to efficiently obtain effect of the fine tuned correction utilizing the liquid crystal element by disposing the liquid crystal element near to the objective lens as close as possible.

Further, the optical pickup device according to the present invention and structured as above described may further include a control portion which controls driving of the liquid crystal element and the liquid lens based on a signal that is obtained by processing of electric signal obtained by the photo detecting portion. By this structure, because it becomes possible to always keep the corrected value of the spherical aberration to an adequate value even when there is variation or the like in thickness of the transparent cover layer of the optical recording medium, for example, it becomes possible to provide the optical pickup device by which correction of the spherical aberration can be adequately performed.

DETAILED DESCRIPTION OF THE PREFERRED EMBODIMENTS

Hereinafter embodiment of the present invention will be explained with reference to drawings. It should be noted that the embodiment shown here is mere an example, and the present invention is not limited to the embodiment shown here.

Figure 1:
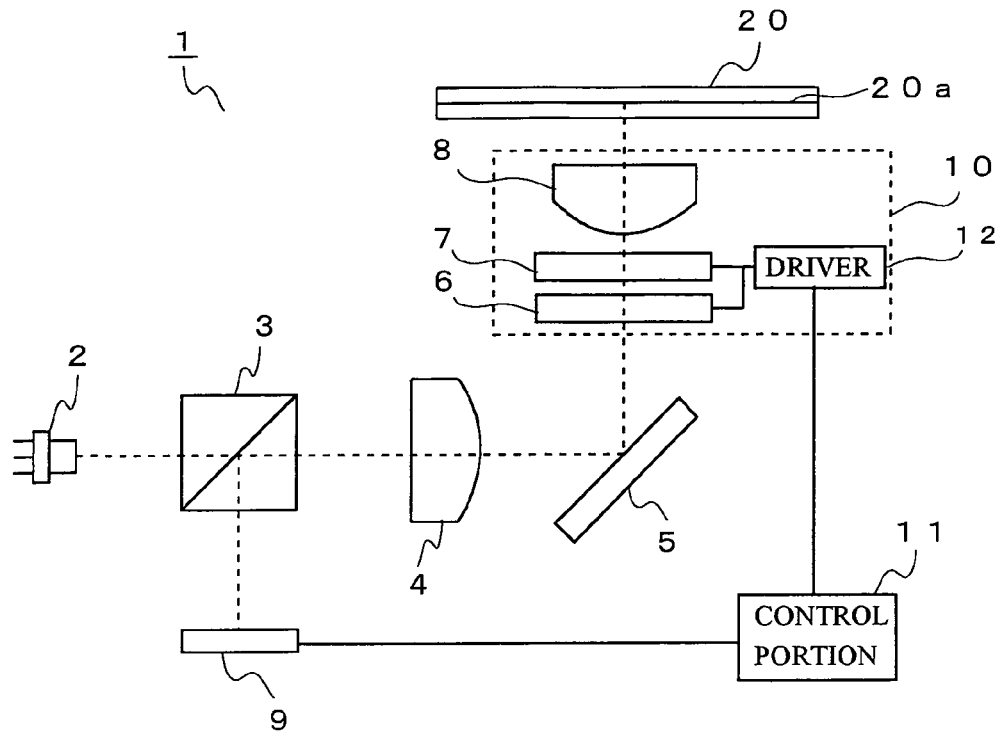
FIG. 1 is a schematic diagram to show a structure of an optical pickup device according to the present embodiment.

FIG. 1 is a schematic diagram to show a structure of an optical pickup device according to the present embodiment. An optical disc (optical recording medium) 20 to which an optical pickup device 1 according to the present embodiment is applied is a BD. It should be noted that the term BD described here includes an optical disc which has a plurality of recording layers 20a (multilayer optical disc) and an optical disc which has only single recording layer 20a.

In the multilayer optical disc, generation of spherical aberration becomes a problem as above described because thickness of transparent cover layer (a layer to protect the recording layer 20a and hereinafter an intermediate layer which is disposed between the recording layers is also included as the transparent cover layer) is different for every recording layer. Therefore, the optical pickup device which is described here and to be applied to a BD must have function to correct the spherical aberration. As a result, the optical pickup device 1 according to the present embodiment has the function to correct the spherical aberration. Further, the optical pickup device 1 is characterized by structure of the function to correct the spherical aberration.

It should be noted that in the present embodiment an explanation will be given about a structure which is applied only to a BD as one example, however, the present invention is not intended to be limited to this example. The present invention can be applied as well as to an optical pickup device of a type that can perform reading and writing of information from/to a plurality of kinds of optical discs (for example, an optical pickup device which is compatible to a BD, a DVD, and a CD, or compatible to a BD, a HD-DVD, and a DVD, or the like). There is a possibility that thickness of the transparent cover layer is different depending on kind of the optical disc, and for these cases amount of generation of the spherical aberration becomes large and correction of the spherical aberration is necessary. That is, the present invention is useful too, for the optical pickup device that can perform reading and writing of information from/to a plurality of kinds of optical discs.

As shown in FIG. 1, an optical system of the optical pickup device 1 is equipped with a light source 2, a beam splitter 3, a collimator lens 4, an upstand mirror 5, a liquid lens 6, a liquid crystal element 7, an objective lens 8, and a photo detector 9.

The light source 2 is a semiconductor laser which emits a laser beam having a wavelength of 405 nm band for a BD. It should be noted that in the present embodiment, to explain about the optical pickup device 1 which can be applied only to a BD, a structure is employed to emit only a laser beam having single wavelength from the light source 2. However, in a case where the optical pickup device is applied to the plurality of kinds of optical discs, a plurality of kinds of semiconductor lasers may be disposed such that laser beams having different wavelength bands can be emitted, for example. In such case, for example, dichroic prism or the like may be employed so that optical axes of the laser beams which are emitted from the respective semiconductor lasers are aligned.

The beam splitter 3 plays a role to transmit the laser beam which is emitted from the light source 2 and is input to the beam splitter 3, and to guide it to the optical disc 20 side, and a role to reflect the laser beam which is reflected by the optical disc 20 and is input to the beam splitter 3, and to guide it to the photo detector 9.

The collimator lens 4 converts the laser beam which is emitted from the light source 2 and passes the beam splitter 3, to parallel light. The upstand mirror 5 reflects the laser beam which is sent from the collimator lens 4 to lead direction of the laser beam in a direction which is substantially perpendicular to a disc surface of the optical disc 20.

Figure 2A:
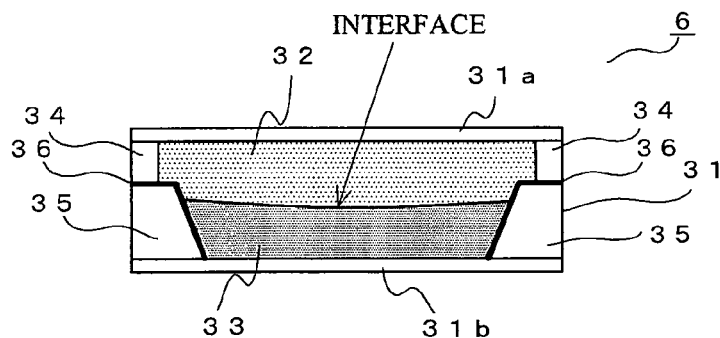
FIG. 2A is an explanatory diagram to explain a structure and its operation of a liquid lens which is provided in the optical pickup device according to the present embodiment and to show a state where no voltage is applied to electrodes which are provided in the liquid lens.
Figure 2B:
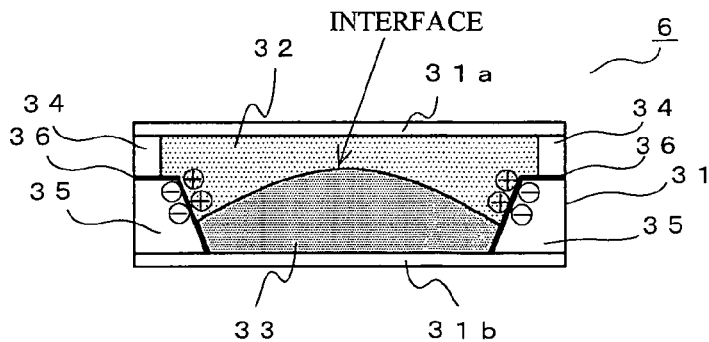
FIG. 2B is an explanatory diagram to explain a structure and its operation of a liquid lens which is arranged in the optical pickup device according to the present embodiment and to show a state where voltage is applied to the electrodes which is arranged in the liquid lens.

The liquid lens 6 is an element which can change a state of the lens surface by adjusting amount of voltage that is applied to the liquid lens, correction of the spherical aberration can be performed utilizing this lens by changing degree of convergence or degree of divergence of the light beam which is input. Structure of the liquid lens 6 is well known (for example, see JP-A-2006-147057 and the like). Because the liquid lens 6 in the present embodiment has the same structure as the well known liquid lens, hereinafter structure and operation of the liquid lens will be briefly explained with reference to FIG. 2A and FIG. 2B. It should be noted that FIG. 2A and FIG. 2B are explanatory diagrams to explain a structure and its operation of the liquid lens 6, FIG. 2A shows a state where voltage is not applied to electrode which is provided on the liquid lens 6, and FIG. 2B shows a state where voltage is applied to the electrode which is provided on the liquid lens 6.

The liquid lens 6 has a structure in which conductive aqueous solution 32 (hereinafter simply referred to as solution) and insulative oil 33 (hereinafter simply referred to as oil) are enclosed in a glass container 31 formed to have a transparent top surface 31a and a transparent bottom surface 31b. Further on the liquid lens 6, a positive electrode 34 and a negative electrode 35 are formed on side surfaces of the glass container 31. In the present embodiment the positive electrode 34 is formed at upper side, and the negative electrode 35 is formed at lower side. It should be noted that in this embodiment both of the positive electrode 34 and the negative electrode 35 are metal electrodes.

In the liquid lens 6, the positive electrode 34 is in a state where it contacts with the solution 32, but the negative electrode 35 is in a state where it does not contact with the solution 32 by an insulative portion 36 which is disposed to cover the negative electrode. It should be noted that the positive electrode 34 and the negative electrode 35 do not contact with each other because of existence of the insulating portion 36. Though it is not shown, a water repellent coating is partly formed inside of the glass container 31. This water repellent coating has an effect on a shape of an interface between the solution 32 and the oil 33 (interface to act as a lens), and state of the interface before voltage is applied is adjusted by how the water repellent coating is formed.

The liquid lens 6 is structured as above described and when voltage is applied between the positive electrode 34 and the negative electrode 35, the solution is charged positively because the positive electrode 34 and the solution 32 contact with each other. The solution 32 which is charged positively is attracted by the negative electrode 35 which is charged negatively, and the charge is gathered around the insulating portion 36 (see, FIG. 2B). As a result, an interface tension in the glass container 31 becomes off balance from an initial state, and the shape of the interface between the solution 32 and the oil 33 is changed (in FIG. 2A and FIG. 2B, the interface becomes a convex state from a concave state).

The interface between the solution 32 and the oil 33 becomes a lens surface which converges or diverges light that is input to the liquid lens 6. The shape of the interface (lens surface) can be adjusted by magnitude of the applied voltage. Therefore, correction of the spherical aberration can be performed by changing degree of convergence or degree of divergence of the laser beam which is input to the liquid lens 6.

Figure 3A:
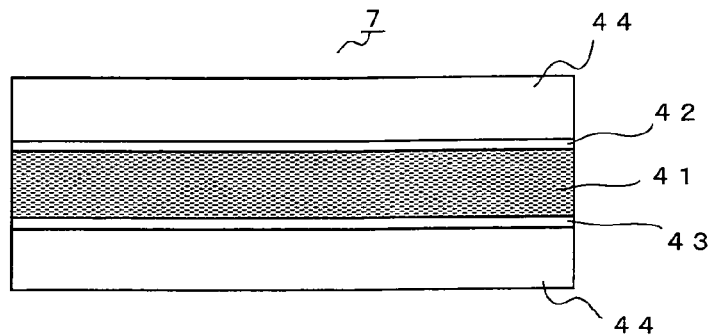
FIG. 3A is a schematic cross sectional view to show a structure of a liquid crystal element which is provided in the optical pickup device according to the present embodiment.
Figure 3B:
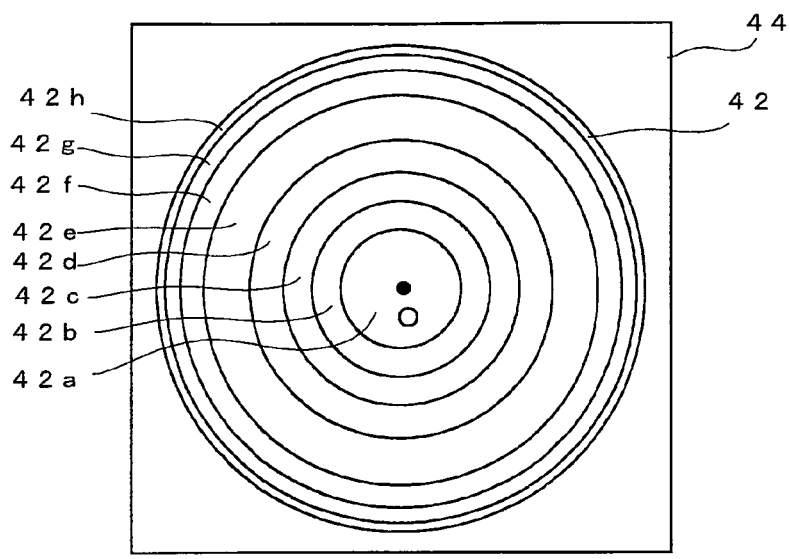
FIG. 3B is a schematic plan view to show a structure of a liquid crystal element which is provided in the optical pickup device according to the present embodiment.
Figure 4:
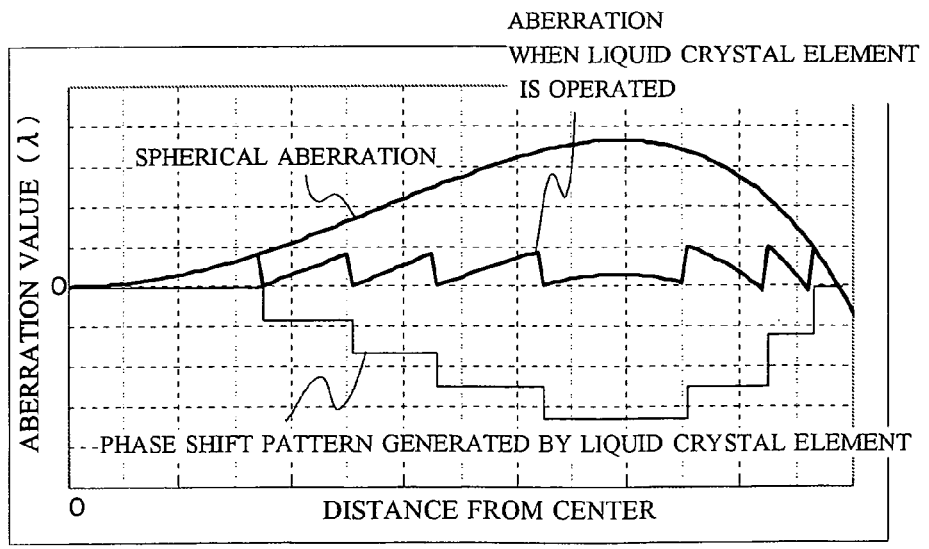
FIG. 4 is an explanatory diagram to explain an action of the liquid crystal element which is provided in the optical pickup device according to the present embodiment.

Now return to FIG. 1, the laser beam which passes the liquid lens 6 is input to the liquid crystal element 7. The liquid crystal element 7 is an element which controls change of refraction index and adjusts phase of the input laser beam utilizing character that molecules of the liquid crystal change their orientation direction by applying voltage on the liquid crystal which is sandwiched by the transparent electrodes (not shown in FIG. 1). About structure and action of the liquid crystal element 7 explanation will be given with reference to FIG. 3A, FIG. 3B, and FIG. 4. It should be noted that FIG. 3A and FIG. 3B are explanatory diagrams to explain structure of the liquid crystal element 7 which is provided in the optical pickup device 1 according to the present embodiment, FIG. 3A is a schematic cross sectional view to show the structure of the liquid crystal element 7, and FIG. 3B is a schematic plan view to show the structure of the liquid crystal element 7. FIG. 4 is an explanatory diagram to explain the action of the liquid crystal element 7.

As shown in FIG. 3A and FIG. 3B, the liquid crystal element 7 is provided with a liquid crystal 41, a first transparent electrode 42, a second transparent electrode 43, and two glass plates 44. The liquid crystal 41 is in a state where it is sandwiched between the first transparent electrode 42 and the second transparent electrode 43. When voltage is applied between the two transparent electrodes 42, 43, the orientation of the liquid crystal molecules are changed. Following this, its refraction index is also changed. As a result, a phase shift is generated in the laser beam which passes the liquid crystal 41 with the change in the refraction index of the liquid crystal 41.

The first transparent electrode 42 and the second transparent electrode 43 are formed by ITO or the like and have translucency. These transparent electrodes 42, 43 are both held by the glass plates 44. In the present embodiment, as shown in FIG. 3B, the first transparent electrode 42 is formed in divided electrodes which are divided into a plurality of concentric circular regions (42a-42h). From the respective divided electrodes (regions) 42a-42h wirings which are not shown are drawn out and made to have electric potential independently. On the other hand the second transparent electrode 43 is not formed in divided electrodes and it is formed in a single common electrode. Therefore, the liquid crystal 41 which is sandwiched between the respective regions 42a-42h of the first transparent electrode 42 and the second transparent electrode 43 forms a plurality of phase shift regions which generate different phase shifts. As a result it is possible to generate phase distribution in the laser beam which passes the liquid crystal element 7 utilizing the phase shift regions which are formed the same number as the respective regions 42a-42h in the first transparent electrode 42.

It should be noted that a structure in which eight regions 42a-42h are formed by dividing the first transparent electrode 42 is employed in the present embodiment. However, the present invention is not intended to be limited to this embodiment. This number of regions may be changed adequately depending on state of generation of the spherical aberration. Further in the present embodiment though the second transparent electrode 43 is made as the common electrode, the second transparent electrode 43 may be made as the divided electrode as well as the first transparent electrode 42 as the case may be. However in such a case, because number of the wirings which are drawn out from the two transparent electrodes 42, 43 becomes large, it is preferable that any one of the two transparent electrodes 42, 43 is made not as the divided electrode but as the common electrode as the present embodiment.

The liquid crystal element 7 is structured as above described, next about operation of the liquid crystal element 7 explanation will be given with reference to FIG. 4 as below. It should be noted that in FIG. 4 the term distance from center means a distance from a center O (see, FIG. 3B) of the concentric circles of the first transparent electrode 42 which is divided into the plurality of concentric circular regions 42a-42h.

In case where the spherical aberration which is shown as a bold solid line in FIG. 4, is generated in the laser beam that is emitted from the light source 2, a phase shift pattern which is shown as a thin solid line in FIG. 4 is generated by applying voltages between the first transparent electrode 42 and the second transparent electrode 43 in the liquid crystal element 7 (to the respective divided regions 42a-42h in the first transparent electrode 42 appropriate potentials are applied independently). This arrangement makes the laser beam which passes the liquid crystal element 7 have the phase distribution. Because the phase distribution is generated to have the reversed polarity with respect to the spherical aberration, it can reduce the spherical aberration which is generated in the laser beam. Result of this reduction is shown in FIG. 4 as aberration when the liquid crystal is operated and level of the aberration is kept within an allowable level in which deterioration of quality is not caused when reading or writing of information is performed by the optical pickup device 1.

For the laser beam which is reflected by the upstand mirror 5 as above described, it is possible to correct large spherical aberration because correction of the spherical aberration can be performed by both of the liquid lens 6 and the liquid crystal element 7. Further, when the number of division of the first transparent electrode 42 is increased, for example, in the liquid crystal element 7, it becomes possible to perform fine tuned correction by which generated spherical aberration is evenly suppressed in a low level as a whole. As a result, when correction of the spherical aberration is performed with combination of the liquid lens 6 and the liquid crystal element 7 in the present embodiment, it becomes possible to correct adequately the large spherical aberration.

It should be noted that it is not necessary to perform correction of the spherical aberration with operating always both of the liquid lens 6 and the liquid crystal element 7, so any one of the liquid lens 6 and the liquid crystal element 7 may be operated depending on magnitude of the spherical aberration. Further, the present embodiment employs a structure in which the liquid lens 6 and the liquid crystal element 7 are driven by one driver 12. By this arrangement even when correction of the spherical aberration is performed utilizing two elements of the liquid lens 6 and the liquid crystal element 7, wirings that are provided in the optical pickup device 1 does not become complicated. Details of this point will be described later.

Further in the present embodiment, the elements which have function to perform correction of the spherical aberration, are disposed in an order of the liquid lens 6 first and the liquid crystal element 7 next from a side nearer to the light source 2. This is due to consideration that even if the fine tuned correction by which generated spherical aberration is evenly suppressed in a low level as a whole is performed utilizing the liquid crystal element 7, then, there is a possibility that effect of the fine tuned correction may be reduced because of convergence or divergence of the laser beam by the liquid lens 6 when they are disposed in an order of the liquid crystal element 7 first and the liquid lens 6 next from the side nearer to the light source 2, for example.

Further, in a case where they are disposed in the order of the liquid crystal element 7 first and the liquid lens 6 next from the side nearer to the light source 2, if the liquid lens 6 is disposed near to the objective lens 8 in order not to reduce the effect of the fine tuned correction utilizing the liquid crystal element 7, there may be a case that effect of the correction of the spherical aberration cannot be obtained enough by the liquid lens 6. As a result, it is preferable that the liquid lens 6 and the liquid crystal element 7 are disposed in the order of the liquid lens 6 first and the liquid crystal element 7 next from the side nearer to the light source 2 as the present embodiment when the liquid lens 6 and the liquid crystal element 7 are disposed in the optical pickup device.

It should be noted that it is preferable that the liquid crystal element 7 is disposed as near as possible to the objective lens 8 even when the liquid lens 6 and the liquid crystal element 7 are disposed as the present embodiment. By this arrangement effect of the correction utilizing the liquid crystal element 7 can be used effectively.

Now back to FIG. 1, the objective lens 8 has a function to condense the laser beam which passes the liquid lens 6 and the liquid crystal element 7 in this order, to a recording layer 20a on the optical disc 20. The objective lens 8 is mounted on an actuator 10, and is enabled to move in a focus direction which is parallel to an optical axis direction at a position of the objective lens 8 and in a tracking direction which is parallel to a radial direction of the optical disc 20.

By this arrangement the objective lens 8 is adjusted its position such that its focus position is always kept on the recording layer 20a and such that a spot position of the laser beam which is condensed by the objective lens 8 follows a track that is formed on the optical disc 20. Because a structure of the actuator 10 is well known structure in which a lens holder which holds the objective lens 8 is driven by electromagnetic force action, explanation in detail of the structure is omitted here.

It should be noted that the liquid lens 6, the liquid crystal element 7, and the driver 12 to drive the liquid lens 6 and the liquid crystal element 7 are mounted on the lens holder (not shown) in the actuator 10 to hold the objective lens 8. If the objective lens 8, the liquid lens 6, and the liquid crystal element 7 are mounted on the actuator 10 as above described, the liquid lens 6 and the liquid crystal element 7 are also moved along with movement of the objective lens 8. As a result, even when the objective lens 8 moves in the tracking direction, position of the objective lens 8, the liquid lens 6, and the liquid crystal element 7 is not displaced and generation of coma aberration can be suppressed.

As above described, the laser beam which is emitted from the light source 2 and is condensed on the optical disc 20, is reflected by the optical disc 20, and passes the objective lens 8, the liquid crystal element 7, and the liquid lens 6 in this order. After it is reflected by the upstand mirror 5, it passes the collimator lens 4, is reflected by the beam splitter 3, and is condensed on a photo receiving area (not shown) of the photo detector 9.

The photo detector 9 plays a role to convert an optical signal which is received in the photo receiving area into an electric signal. Then, the electric signal from the photo detector 9 is sent to a signal processing portion which is not shown. The signal processing portion generates reproducing signal (RF signal) to reproduce information, focus error signal and tracking error signal which are used to perform focusing adjustment and tracking adjustment of the objective lens 8, and the like. A control portion 11 receives such signals that are processed by the signal processing portion, and controls, for example, the driver 12 to drive the liquid lens 6 and the liquid crystal element 7 such that jitter value is optimized.

It should be noted that the present embodiment employs a structure in which the control portion 11 controls the driver 12 based on the jitter value. However, the present invention is not intended to be limited to the embodiment, and a structure in which amplitude of the RF signal, amplitude of the tracking signal, or the like is used to control the driver 12, for example may be employed.

Figure 5:
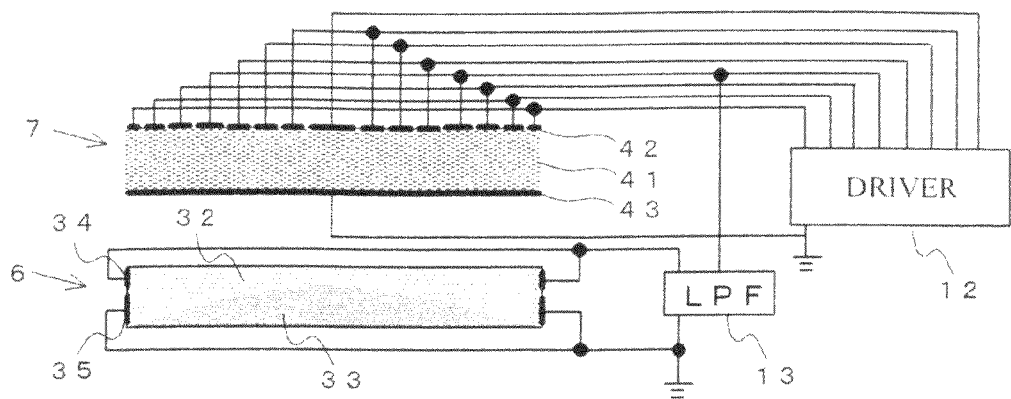
FIG. 5 is an explanatory diagram to explain relation between a liquid lens and a liquid crystal element, and a driver according to the present embodiment.
Figure 6:
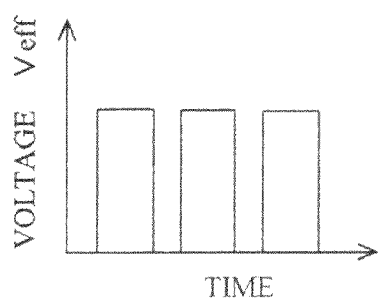
FIG. 6 is an explanatory diagram to explain driving voltage to drive an liquid crystal element according to the present embodiment.
Figure 7:
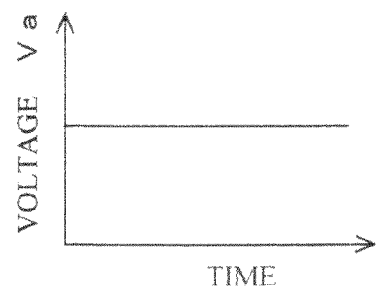
FIG. 7 is an explanatory diagram to explain driving voltage to drive a liquid lens according to the present embodiment.

As above described, the liquid lens 6 and the liquid crystal element 7 are made to be controlled by single driver 12. Hereinafter an explanation will be given about this point with reference to FIG. 5, FIG. 6, and FIG. 7. FIG. 5 is an explanatory diagram to explain relation between the liquid lens 6 and the liquid crystal element 7, and the driver 12. FIG. 6 is an explanatory diagram to explain driving voltage to drive the liquid crystal element 7. FIG. 7 is an explanatory diagram to explain driving voltage to drive the liquid lens 6.

It should be noted that in FIG. 5, though wirings that are drawn out from the respective plurality of regions 42a-42h (see, FIG. 3) of the first transparent electrode 42 in the liquid crystal element 7 and wirings that are drawn out from the positive electrode 34 and the negative electrode 35 in the liquid lens 6 are enough when one wiring is drawn out from respective regions and electrodes, in order to be understood easily, position where it becomes equal potential, it is shown that two wirings are drawn out from each parts by branching of wiring conventionally.

The wirings that are drawn out from the plurality of regions 42a-42h (see, FIG. 3B) which compose the first transparent electrode 42 of the liquid crystal element 7, are connected electrically with respective electrodes (not shown) which is included in the driver 12. By this arrangement electric potential can be applied independently to each of the plurality of regions 42a-42h that composes the first transparent electrode 42. Further, because the second transparent electrode 43 in the liquid crystal element 7 is a common electrode, one wiring is drawn out from it and is connected electrically with an electrode of the driver 12. It should be noted that the second transparent electrode 43 is in a state where the electrode is grounded.

One of the wiring among the plurality of wirings that are drawn out from the first transparent electrode 42 and are connected electrically with the electrode of the driver 12, is branched and connected electrically with a low pass filter (LPF) 13. Two wirings which are drawn out from the low pass filter 13 are connected electrically with positive electrode 34 and the negative electrode 35 of the liquid lens 6 respectively. It should be noted that one wiring which is connected with the negative electrode 35 of the liquid lens 6 out of wirings which are drawn out from the low pass filter 13, is grounded.

The driver 12 outputs pulse voltage. Therefore, the liquid crystal element 7 is pulse-driven by pulse voltage Veff as shown in FIG. 6. On the other hand, voltage that is applied to the liquid lens 6 is voltage output from the low pass filter 13 and the low pass filter 13 has a function to smooth waveform of the voltage output from the driver 12. As a result, the liquid lens 6 is driven by voltage Va which has an approximately constant value with respect to time change as shown in FIG. 7.

As above described, in the optical pickup device 1 according to the present embodiment a structure in which the liquid lens 6 is also driven by the driver 12 which drives the liquid crystal element 7 is employed. Therefore, wirings become simple by providing the single driver 12 though it is necessary, essentially, to drive the liquid lens 6 and the liquid crystal element 7 individually by separate drivers and wirings of the optical pickup device become complicated. As a result, in case where the liquid lens 6 and the liquid crystal element 7 are mounted on the actuator 10 as the present embodiment, though complicated wirings becomes serious problem, the present invention can make the problem be solved.

It should be noted that the present embodiment employs the structure in which one of the wiring among the plurality of wirings that are drawn out from the first transparent electrode 42 and are connected electrically with the electrode of the driver 12, is branched and connected electrically with the low pass filter 13. The wiring which is branched and connected with the low pass filter 13, may be decided adequately in response to designing of the optical pickup device 1 from among the plurality of wirings that are drawn out from the first transparent electrode 42 and are connected electrically with the electrode of the driver 12. Further, a plurality of wirings may be branched, the wirings may be switched and used to be connected to the low pass filter 13 as a case may be in a level as far as the complicated wirings do not become problem. In addition, voltage which is output from the low pass filter 13 becomes lower than voltage which is output from the driver 12. Therefore, an amplifier circuit, for example, may be disposed before the low pass filter 13, as a case may be.

In addition, the optical pickup device 1 as described above employs a structure in which the driver 12 is controlled utilizing result which is obtained by processing the electric signal (for example, jitter value) output from the photo detector 9. However, the present invention is not intended to be limited to the structure. A driving of the driver 12 may be performed based on only prescribed value which is determined by position of the recording layer 20a from which the optical pickup device 1 performs reading of information or the like, or kinds of the optical disc 20 or the like. That is, the driver 12 may not be controlled by feed back type.

By the optical pickup device in accordance with the present invention, the spherical aberration which causes problem in the optical pickup device that is applicable to a multilayer optical disc which has a plurality of recording layers, or the optical pickup device that is applicable to a plurality of kinds of optical discs, can be adequately corrected. Therefore, the optical pickup device in accordance with the present invention is useful.

What is claimed is:

1. An optical pickup device comprising:
   a light source;
   an objective lens which condenses a light beam that is emitted from the light source on a recording layer of an optical recording medium;
   a photo detecting portion which receives reflected light that is reflected by the optical recording medium;
   a liquid crystal element which is disposed on an optical path between the light source and the objective lens, on which a plurality of phase shift regions are formed to adjust phase of the input light beam, and which performs correction of spherical aberration by phase adjustment of the phase shift regions; and
   a liquid lens which is disposed on the optical path between the light source and the objective lens, and which performs correction of the spherical aberration by changing state of convergence or divergence of the input light beam.

2. The optical pickup device according to claim 1, wherein the liquid lens is driven utilizing a driving portion which drives the liquid crystal element.

3. The optical pickup device according to claim 2, wherein
   the driving portion is arranged to output pulse voltage,
   the liquid crystal element is driven by the pulse voltage,
   a low pass filter to smooth waveform of the voltage that is output from the driving portion is disposed between the driving portion and the liquid lens, and
   the liquid lens is driven by output voltage from the low pass filter.

4. The optical pickup device according to claim 3, further comprising:
   an actuator on which the objective lens is mounted and which enables the objective lens to move, wherein
   the liquid crystal element and the liquid lens are mounted on the actuator with the objective lens.

5. The optical pickup device according to claim 3, wherein the liquid crystal element is disposed nearer to the objective lens between the liquid crystal element and the liquid lens.

6. The optical pickup device according to claim 3, further comprising a control portion which controls driving of the liquid crystal element and the liquid lens based on a signal that is obtained by processing of electric signal obtained by the photo detecting portion.

7. The optical pickup device according to claim 2, further comprising:
   an actuator on which the objective lens is mounted and which enables the objective lens to move, wherein
   the liquid crystal element and the liquid lens are mounted on the actuator with the objective lens.

8. The optical pickup device according to claim 2, wherein the liquid crystal element is disposed nearer to the objective lens between the liquid crystal element and the liquid lens.

9. The optical pickup device according to claim 2, further comprising a control portion which controls driving of the liquid crystal element and the liquid lens based on a signal that is obtained by processing of electric signal obtained by the photo detecting portion.

10. The optical pickup device according to claim 1, further comprising:
    an actuator on which the objective lens is mounted and which enables the objective lens to move, wherein
    the liquid crystal element and the liquid lens are mounted on the actuator with the objective lens.

11. The optical pickup device according to claim 1, wherein the liquid crystal element is disposed nearer to the objective lens between the liquid crystal element and the liquid lens.

12. The optical pickup device according to claim 1, further comprising a control portion which controls driving of the liquid crystal element and the liquid lens based on a signal that is obtained by processing of electric signal obtained by the photo detecting portion.

* * * * *